United States Patent [19]

Duijkers

[11] 4,446,483
[45] May 1, 1984

[54] CIRCUIT ARRANGEMENT FOR DERIVING A FIELD SYNCHRONIZING SIGNAL FROM AN INCOMING SIGNAL

[75] Inventor: Peter A. Duijkers, Nijmegen, Netherlands

[73] Assignee: U.S. Philips Corporation, New York, N.Y.

[21] Appl. No.: 353,692

[22] Filed: Mar. 1, 1982

[30] Foreign Application Priority Data

Mar. 12, 1981 [NL] Netherlands ............................ 8101202

[51] Int. Cl.³ .............................................. H04N 5/10
[52] U.S. Cl. ....................................................... 358/154
[58] Field of Search ........................................ 358/154

[56] References Cited

U.S. PATENT DOCUMENTS 3,527,888 9/1970 Clapp et al. ........................... 358/154
3,632,872 1/1972 Ridley .................................. 358/154

FOREIGN PATENT DOCUMENTS 52-50116 4/1977 Japan .................................. 358/154

OTHER PUBLICATIONS

Radio Shack, *Dictionary of Electronics*, 1974–1975, pp. 368–369, "Monostable".

*Primary Examiner*—John C. Martin
*Assistant Examiner*—Michael D. Parker
*Attorney, Agent, or Firm*—Thomas A. Briody; William J. Streeter

[57] ABSTRACT

A circuit arrangement for deriving a field synchronizing signal from an incoming signal which contains at least line synchronizing and field synchronizing pulses the amplitude of which extends between a reference and a peak level, comprising a signal generator for generating a signal each time a pulse having a value which is located between the reference and the peak level occurs in the incoming signal. Said signal whose value is a measure of the duration of said pulse is compared with a first threshold value. During the occurrence of the line synchronizing pulses the signal of the signal generator is inhibited as long as the first threshold value has not yet been reached. The signal from the signal generator is compared with a second threshold value which is a measure of a pulse duration which exceeds the duration corresponding to the first threshold value. The field synchronizing signal is generated as soon as the second threshold value is reached.

12 Claims, 2 Drawing Figures

CIRCUIT ARRANGEMENT FOR DERIVING A FIELD SYNCHRONIZING SIGNAL FROM AN INCOMING SIGNAL

The invention relates to a circuit arrangement for deriving a field synchronizing signal from an incoming signal which contains at least line synchronizing and field synchronizing pulses whose amplitude extends between a reference and a peak level, comprising a signal generator for generating a signal each time a pulse having a value which is located between the reference and the peak level occurs in the incoming signal, said signal having a value which is representative of the duration of said pulse, and a comparator stage for comparing the generated signal with a threshold value.

BACKGROUND OF THE INVENTION

Such a circuit arrangement is disclosed in U.S. Pat. No. 3,678,199. The pulses causing the generation of a signal by the signal generator may be line synchronizing, field synchronizing and, also interference pulses, the reference level of said pulses being usually only slightly different from the black level of the video information. However, the threshold value has been chosen such that only the field synchronizing pulses are of a sufficiently long duration to produce a signal which exceeds the threshold value.

In this prior art circuit arrangement the threshold value must be chosen to be rather high to enable a somewhat reliable distinction between a field synchronizing pulse and a different, shorter pulse. If the incoming signal contains much noise then the threshold value will, however, not always been reached, while the signal produced by the signal generator between two consecutive pulses is not zero. This may cause the field synchronization to get lost. Furthermore, even in the event of little noise a hum voltage may be superposed on the television signal, which hum voltage may originate from, for example, an intermediate frequency amplifier, causing a direct current shift of the incoming signal, so that there is a risk that the threshold value is not reached at the proper moment.

OBJECT OF THE INVENTION

The invention has for its object to provide a circuit arrangement for more reliably generating the field synchronizing signal and according to the invention, the circuit arrangement is characterized in that the circuit arrangement also comprises a gate circuit for, in operation, inhibiting the output signal from the signal generator during the occurrence of the line synchronizing pulses before the threshold value is reached by the signal from the signal generator, this gate circuit being inoperative when said threshold value has been reached by said signal, whereby the circuit arrangement generates the field synchronizing signal when the signal from the signal generator reaches a second threshold value which is representative of a pulse duration which exceeds the duration corresponding to the first mentioned threshold value.

As in accordance with the invention the line synchronizing pulses have no influence during a long period of time on the signal produced by the signal generator, the first threshold value may be chosen rather low, that is to say corresponding to a comparatively short pulse duration, while the second threshold value, which initiates the generation of the field synchronizing signal, may be chosen to be relatively high. This results in an improved reliability and an improved noise insensitivity.

In an embodiment the circuit arrangement is characterized in that the gate circuit comprises a gate for passing, outside the field blanking interval, pulses at the line frequency whose occurrence periods substantially include those of the line synchronizing pulses and for inhibiting the supply of said pulses at the line frequency after the signal from the signal generator has reached the first threshold value.

The circuit arrangement may be characterized in that it further comprises a monostable element for maintaining the gate circuit during a predetermined period of time after the second threshold value has been reached by the signal from the signal generator in the state in which the gate inhibits the supply of the pulses at the line frequency.

The signal generator may generate during the occurrence of a pulse in the incoming signal a substantially linear signal, the slope of which is reduced after the first threshold value has been reached.

SUMMARY OF THE INVENTION

Preferably, the circuit arrangement in accordance with the invention is characterized in that it comprises a bistable element which is in a first state when the signal from the signal generator is lower than the first threshold value and in a second state after the signal has reached the first threshold value, the second state being maintained until at least the end of the field synchronizing signal, in which second state the bistable element maintains the gate circuit in the state in which the gate inhibits the supply of the pulses of the line frequency.

BRIEF DESCRIPTION OF THE DRAWINGS

The invention will now be explained in detail by way of non-limitative example with reference to the accompanying Figures in which.

DETAILED DESCRIPTION OF THE PREFERRED EMBODIMENTS

Figure 1:
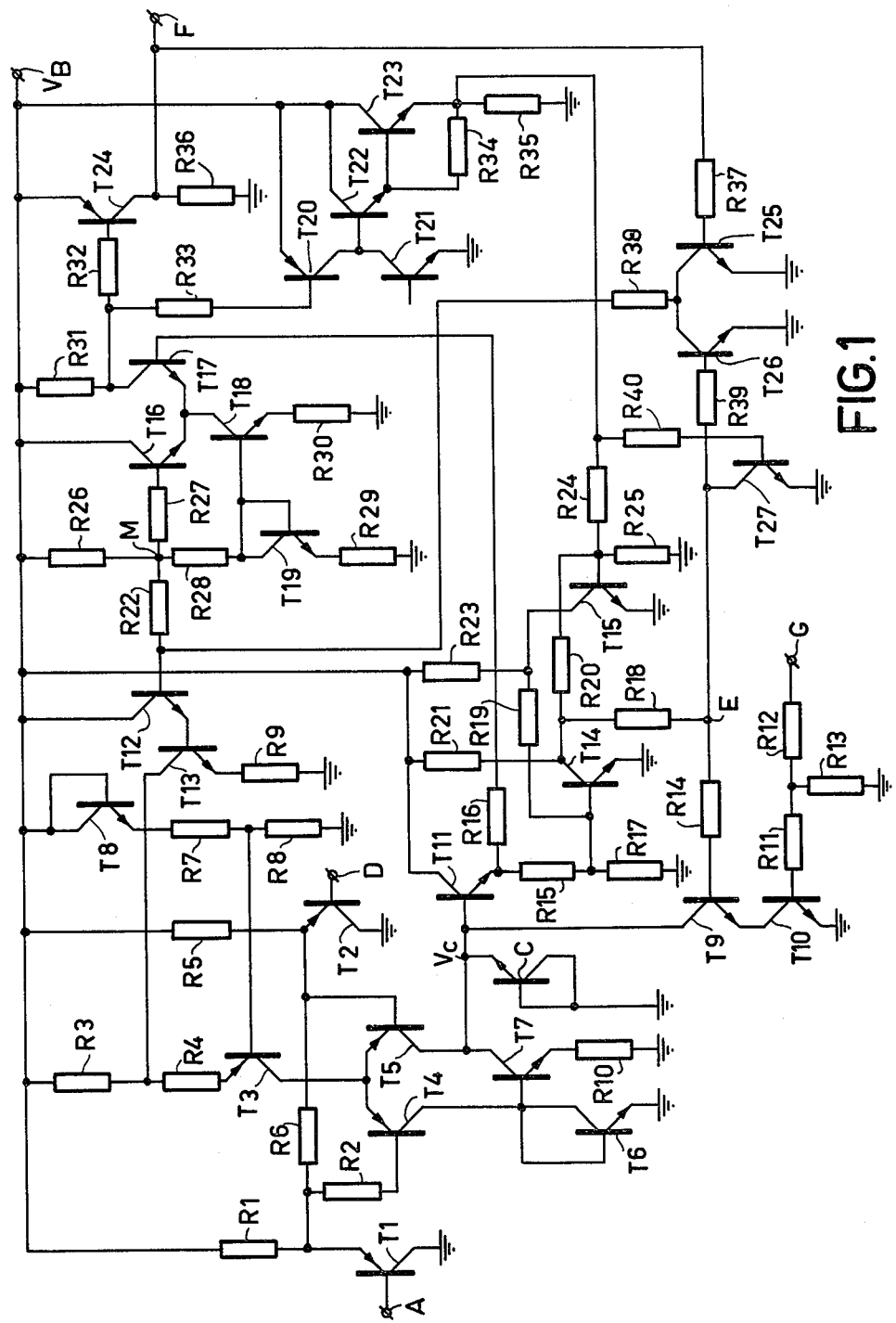
FIG. 1 shows an embodiment of the circuit arrangement in acordance with the invention suitable to be included in an integrated circuit for generating a field synchronizing signal in a television receiver.

An input terminal A of the circuit arrangement of FIG. 1 is connected to the base of a pnp-transistor T1 the collector of which is connected to ground, while the emitter is connected to the junction of a 8.2 kΩ resistor R1 and a 10 kΩ resistor R2. The other end of resistor R1 is connected to the positive terminal of a supply voltage source $V_B$ of 12 V, the negative terminal of which is connected to ground. The other end of resistor R2 is connected to the base of a pnp transistor T4, the first terminal of resistor R2 being connected to a resistor R6 of 1.5 kΩ. The other terminal of resistor R6 is connected to the emitter of a pnp-transistor T2 and to the base of a pnp-transistor T5. The collector of transistor T2 is connected to ground, while the base is connected to an input terminal D of the circuit and the emitter to source $V_B$ via a resistor R5 of 4.3 kΩ. Terminal A is connected to a video circuit, not shown, and terminal D is connected to a d.c. voltage of 8 V.

The emitters of transistors T4 and T5 are interconnected and connected to the collector of a pnp-transistor T3, the emitter of which is connected to source $V_B$ via two series-arranged resistors R4 of 22 kΩ and R3 of 1.5 kΩ, while the base is connected to the junction of a resistor R7 of 1 kΩ and a resistor R8 of 15 kΩ. The other end of resistor R7 is connected to the emitter of an npn-transistor T8, the other end of resistor R8 being connected to ground. The collector and the base of transistor T8 are both connected to source $V_B$.

The collector of transistor T4 is connected to the base and to the collector of an npn transistor T6 and to the base of an npn-transistor T7. The emitter of transistor T6 and also a 30 kΩ emitter resistor R10 of transistor T7 are connected to ground. The collectors of transistors T5 and T7 and also the collector of an npn transistor T9 and the emitter of a further pnp-transistor are interconnected. The base and the collector of said further transistor are connected to ground. As is known, during operation such a transistor behaves as a small capacitance, in this example having a value of approximately 18 pF, with respect to ground. For this reason, this transistor is denoted in FIG. 1 by the symbol C. In addition, the emitter of transistor T9 is connected to the collector of an npn-transistor T10 whose emitter is connected to ground and whose base is connected to an input terminal G via two series-arranged resistors R11 of 4.7 kΩ and R12 also of 4.7 kΩ. A 4.3 kΩ resistor R13 is connected between the junction of said resistors and ground.

The junction point of transistors T5, T7 and T9 and of capacitor C is also connected to the base of an npn-transistor T11. The collector of transistor T11 is connected to voltage $V_B$, while the emitter is connected to a 6.8 kΩ resistor R15. The other end of resistor R15 is connected to a 6.8 kΩ resistor R17, to a resistor R19 also having a value of 6.8 kΩ and to the base of an npn-transistor T14. The other terminal of resistor R17 and also the emitter of transistor T14 are connected to ground. Via a 15 kΩ resistor R18 and a 4.7 kΩ resistor R14 arranged in series therewith, the collector of transistor T14 is connected to the base of transistor T9. This collector is also connected via a 6.8 kΩ resistor R20 to the base of an npn-transistor T15 the emitter of which is connected to ground while the base is connected to the emitter of an npn-transistor T23 via a 4.7 kΩ resistor R24 and to ground via a 6.8 kΩ resistor R25. The collector resistors R21 and R23 of transistors T14 and T15 both have a value of 12 kΩ and are both connected to source $V_B$. The terminal of resistor R19 which is not connected to the base of transistor T14 is connected to the collector of transistor T15. From the foregoing it will be clear that transistors T14 and T15 with associated resistors form a bistable element (flip-flop).

A resistor R16 having a value of 1 kΩ is arranged between the emitter of transistor T11 and the base of an npn-transistor T17. The emitter of transistor T17 is connected to the emitter of an npn-transistor T16 and to the collector of an npn-transistor T18 whose emitter is connected via a 200Ω resistor R30 to ground and whose base is connected to the collector and to the base of an npn-transistor T19 and also to a resistor R28 having a value of 3.9 kΩ. The emitter of transistor T19 is connected to ground via a resistor R29 having a value of 200Ω. The other terminal of resistor R28 is connected to the base of transistor T16 via a 1.5 kΩ resistor R27, to the base of an npn-transistor T12 via a 3 kΩ resistor R22 and to source $V_B$ via a 9.1 kΩ resistor R26. The collectors of transistors T12 and T16 are both connected directly to source $V_B$ and the collector of transistor T17 is connected to source $V_B$ via a 4.7 kΩ resistor R31. The emitter of transistor T12 is connected to the base of an npn-transistor T13 the collector of which is connected to the junction of resistors R3 and R4 and the emitter is connected to ground via a 8.2 kΩ resistor R9.

Via a resistor R32 and R33, respectively, having a value of 2 kΩ the collector of transistor T17 is connected to the base of a pnp-transistor T24 and T20, respectively, the emitter of which is connected to voltage $V_B$. The collector of transistor T24 is connected to ground via a 12 kΩ resistor R36 and to the base of an npn-transistor T25 via a 11 kΩ resistor R37. The said collector is also connected to the output terminal F of the circuit. The collector of transistor T20 is connected to the collector of an npn-transistor T21 and to the base of an npn-transistor T22. The emitter of transistor T22 is connected directly to the base of transistor T23 and to the emitter thereof via a 16 kΩ resistor R34. The emitter of transistor T21 is directly connected to ground, while the emitter of transistor T23 is connected to ground via a 10 kΩ resistor R35. The collectors of transistors T22 and T23 are connected to voltage $V_B$. The base of transistor T21 is not connected, so that during operation this transistor behaves as a small capacitance of 1 to 2 pF.

A resistor R39 having a value of 4.7 kΩ is connected between the base of an npn-transistor T26 and the junction E of resistors R14 and R18. The collector of an npn transistor T27 is also connected to the said junction. The collectors of transistors T25 and T26 are interconnected and via a resistor R38 having a value of 2.4 kΩ to the base of transistor T12. A 4.7 kΩ resistor R40 is connected between the base of transistor T27 and the emitter of transistor T23. Finally, the emitters of transistors T25, T26 and T27 are connected to ground.

On terminal A there is a negative going video signal during operation. By means of transistor T8 which acts as a diode, and resistors R7 and R8 the base of transistor T3 is adjusted to a substantially constant voltage. Transistor T3 forms a current source; the current thereof flows either through transistor T4 or through transistor T5. Transistors T4 and T5 form a differential amplifier; if the voltage at terminal A exceeds the voltage on terminal D, that is to say if the voltage at the base of transistor T4 exceeds the voltage at the base of transistor T5, then transistor T5 is conductive while transistor T4 and also transistor T6, which acts as a diode, and consequently also transistor T7 which in combination with transistor T6 forms a current mirror, are non-conductive. In these circumstances capacitor C is charged by the collector current of transistor T5. The direct current level on terminal A relative to the level on terminal D has been chosen so high that this charging operation can only be performed when the incoming signal increases to above the reference level, for example during the occurrence of the line synchronizing pulses. Transistors T2 to T7 and C together form a signal generator.

However, on terminal G there are line flyback blanking pulses present coming from a line deflection circuit, not shown, and which are processed in a portion, not shown, of the integrated circuit of which the circuit of FIG. 1 forms part. Each line period (having a duration of approximately 64 µs) these pulses have a positive value for approximately 12 µs. In this period, the line flyback period, transistor T10 is driven to its conducting state, while the pulses during the remaining portion of the line period, the line trace period, have such a low value that transistor T10 does not conduct.

If the voltage $V_c$ across capacitor C is lower than a given value, then transistor T11 does not conduct and consequently transistor T14 is also non-conductive. The collector of transistor T14 carries voltage $V_B$ and the voltage at point E is high. As long as the voltage at terminal G is low, transistors T9 and T10 can, however, not conduct. During the line flyback period transistor T5 as well as transistors T9 and T10 are conductive. The voltage at the collector of transistor T9 is kept very low so that the line synchronizing pulses occurring in the line flyback period in the signal of terminal A cannot cause charging of capacitor C. The same holds for disturbing pulses occurring in the said period of time at terminal A. During the line trace period the video voltage at terminal A is always lower than 8 V and capacitor C is discharged by the collector current of transistor T7 which is conductive because transistor T4 is conductive. Owing to the comparatively high value of resistor R10 this discharging current is rather small so that voltage $V_c$ decreases slowly.

From the foregoing it appears that voltage $V_c$ at the end of the field trace period is substantially zero. During the field blanking interval occurring thereafter, there first occur five pre-equalizing pulses having a duration of approximately 2.3 μs with a time difference of half a line period, i.e. approximately 32 μs. These pulses are followed by five field synchronizing pulses the total duration of which is also 2.5 line periods and between which field serration pulses the duration of which is equal to the duration of the line synchronizing pulses, namely approximately 4.7 μs occur. They are followed by five post-equalizing pulses. This holds for the European television standard. Other television standards, for example the United States standard deviate from this in a few details, which is of no importance for the invention.

Figure 2:
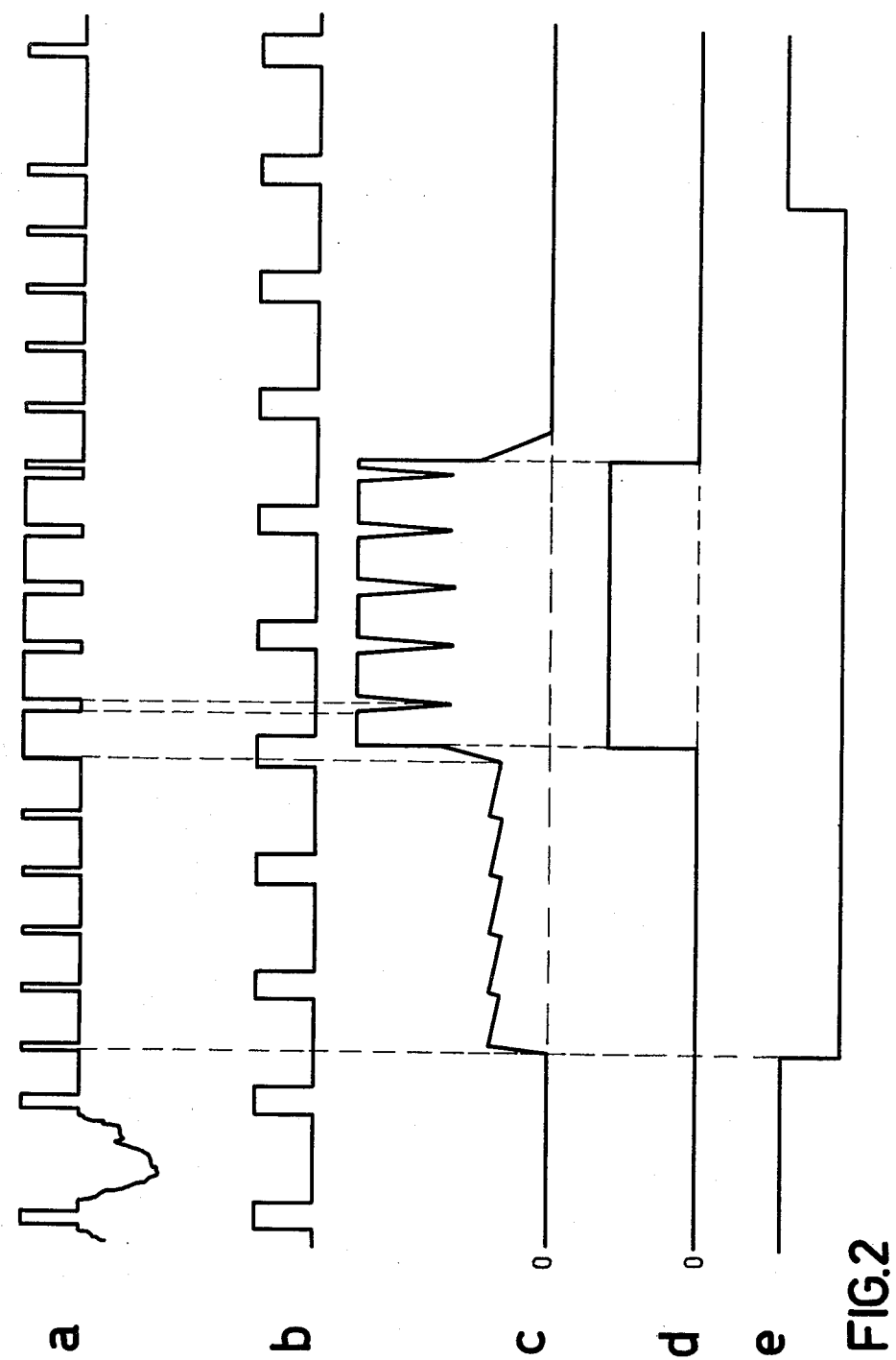
FIG. 2 shows waveforms present in the circuit arrangement of FIG. 1 during operation.

FIG. 2a illustrates the video signal present at terminal A, more specifically for a portion of one of the two fields which form a picture, in this case the field which ends with a full line. Also the line period which follows immediately after the post-equalizing interval is shown. Thereafter there follow a number of line periods until the beginning of a new field trace. FIG. 2b shows the signal applied to terminal G. From FIGS. 2a and 2b it appears that the first pre-equalizing pulse, as it does not coincide with a line flyback pulse, causes charging of capacitor C. Voltage $V_C$ (see FIG. 2c), which was substantially zero now increases substantially linearly.

By means of resistors R22, R26, R28, R29 and R38 as well as the transistor T19 which acts as a diode the voltage at the junction M of resistors R22, R26, R27 and R28 is adjusted to a low value when transistor T26 conducts. Transistor T16 is conductive, while transistor T17 which forms in conjunction with transistor T16 and the transistor T18, which acts as a current source, a differential amplifier, is non-conductive. Since transistor T17 is non-conductive, the collector thereof carries voltage $V_B$, so that transistor T20 and T24, and consequently also transistors T22 and T23 are non-conductive, resulting in that the output voltage at terminal F (see FIG. 2d) and also the voltage at the emitter of transistor T23 are zero. Also transistors T25 and T27 are non-conductive.

As long as the voltage at the base of transistor T11 is too low to render said transistor conductive, transistor T14 remains also non-conductive. The voltage at terminal E (see FIG. 2e) is high but as the voltage at terminal G is low, transistor T9 cannot conduct. Transistor T15 whose base is connected to voltage $V_B$ via resistor R20 is conductive. In a similar manner transistor T26 is conductive as the base resistor R39 thereof is connected to point E. A small collector current flows through transistor T12 whose base is connected to point M via resistor R22 and to ground via resistor R38, and consequently also through transistor T13. The emitter current of transistor T3 and consequently also the charging current of capacitor C have a high value, so that voltage $V_C$ increases rather rapidly.

Transistor T11 operates as a level detector. As soon as voltage $V_C$ exceeds the value which is equal to twice the base-emitter threshold voltage of a conductive transistor, i.e. approximately 1.5 V, then transistor T11 and consequently also transistor T14 are rendered conductive. The voltage at the collector of transistor T14 and the voltage at point E (see FIG. 2e) become substantially zero. This decrease in voltage is transferred by means of resistor R18 to the base of transistor T26 and by means of resistor R20 to the base of transistor T15, as a result of which these transistors become non-conductive. The resulting increase of the voltage at the collector of transistor T15 is transferred to the base of transistor T14 by means of resistor R19. So this transistor becomes conductive in a cumulative manner as a result of which the flip-flop formed by transistors T14 and T15 changes to its other state.

As transistor T26 is non-conductive, the voltage at point M assumes a higher value of approximately 4.2 V, as a result of which the emitter current of transistor T12 and consequently also the emitter current of transistor T13 become larger. The collector current of transistor T13 flows through resistor R3 and is subtracted from the emitter current of transistor T3. This causes the charging current of capacitor C to decrease to a lower value, namely approximately 10 times as low, and voltage $V_C$ increases less rapidly. As long as the voltage at the emitter of transistor T11 is lower than approximately 4.2 V, transistor T17 remains in the non-conductive state. So the state of transistors T20, T22, T23, T24, T25 and T27 does not change and the output signal remains zero.

The second value of the charging current is so low and the value of approximately 4.2 V has been chosen so high that the equalizing pulse is too short to cause this value to be reached. At the end of the occurrence of the pulse the voltage at terminal A decreases, causing transistors T4 and T6 and consequently also transistor T7 to become conductive, while transistor T6 is cut-off. As a result thereof capacitor C is discharged by a small current. Voltage $V_C$ decreases slowly. Transistor T11 remains conductive but no change occurs in the state of the remaining portion of the circuit, particularly not in the state of flip-flop T14, T15. As the voltage at point E remains low, transistor T9 cannot conduct. The line flyback pulse occurring after the first pre-equalizing pulse at terminal G has therefore no influence on voltage $V_C$. The same holds for the subsequent line flyback pulses, while each one of the remaining pre-equalizing pulses produce a slight increase of voltage $V_C$, so that voltage $V_C$ varies little.

As the field synchronizing pulse is of a longer duration than the equalizing pulse the voltage at the emitter of transistor T11 is able to reach the value of approximately 4.2 V after the occurrence of the leading edge of said synchronizing pulse. The circuit, the charging current in particular, is dimensioned such that this second level is reached approximately 15 μs after the first level has been reached, causing transistor T17 to become conductive and transistor T16 to become non-conductive. So said transistors form a second level detector. The voltage at the collector of transistor T17 decreases, in response to which transistors T20 and T24 become conductive. A positive edge is now present at output terminal F and causes transistor T25 to become conductive. Resistor R38 is now connected to a low potential and the voltage at point M assumes a lower value. As a result thereof transistors T12 and T13 conduct to a lesser extent and the charging current of capacitor C assumes a higher value. Voltage $V_C$ increases rapidly until the Zener voltage, approximately 7 V, of the semiconductor diode by which capacitor C is formed, is reached, whereafter voltage $V_C$ does no longer increase. The high value of the charging current ensures that said high level is reached by voltage $V_C$ before the first field serration pulse occurs.

The small capacitor formed by transistor T21 is charged rather rapidly by the collector current of transistor T20. Transistors T22 and T23 become conductive, resulting in that also transistors T15 and T27 become conductive. The voltage at point E remains low and transistors T9 and T26 remain in the non-conductive state. As both the base of transistor T14 and the base of transistor T15 are connected to a positive voltage flip-flip T14, T15 cannot change state.

During the occurrence of the field serration pulses the voltage at terminal A again assumes the value of the reference level. This causes capacitor C to be discharged and voltage $V_C$ decreases. As transistor T25 is conductive that terminal of resistor R38 which is not connected to resistor R22 is connected to ground, so that the value of the second threshold voltage at point M is less than 4.2 V. The voltage at the emitter of transistor T11 also decreases, but owing to the short duration of the serration pulse this voltage does not decrease below the value of the voltage at point M, so that transistor T17 remains conductive and the voltage at terminal F remains high. The line flyback pulses present at terminal G have no influence, as transistor T9 is still non-conductive.

After the last field synchronizing pulse and the first post-equalizing pulse which occurs shortly thereafter, capacitor C is rapidly discharged. As the time before the next equalizing pulse is long enough, the voltage at the emitter of transistor T11 now indeed decreases to below the new value of the second threshold voltage, as a result of which transistor T17 is made non-conductive while transistor T16 becomes conductive. Transistors T20 and T24 are cut-off and the output voltage at terminal F becomes zero. The capacitor formed by transistor T21 discharges to the base of transistor T22. As this base is high-ohmic, said discharge has a determined duration which can be adjusted by selecting the value of resistor R34 and during which the transistors T22 and T23 remain conductive. The state of flip-flop T14, T15 does not change, so that in the said interval post-equalizing pulses and current pulses cannot exercise any influence.

Owing to the fact that transistor T24 is cut-off, transistor T25 is also cut-off which has for its result that the voltage at point M becomes high again. Capacitor C is now further discharged slowly. At the instant at which transistor T11 is cut-off no positive voltage is applied any longer to the base of transistor T14. The flip-flop T14, T15 can now change state. Transistor T15 then conducts while transistor T14 is non-conductive.

Approximately at the end of the post-equalizing interval the capacitor formed by transistor T21 is discharged to such an extent that transistors T22 and T23 are cut-off, as a result of which transistor T27 is made non-conductive. Since the voltage at the collector of transistor T14 is high from the moment onwards at which the state of flip-flop T14, T15 has changed, the voltage at point E also becomes high which drives transistor T9 and T26 to conduction. The voltage at point M becomes low again and the current from transistors T12 and T13 returns to its low value, so that the emitter current from transistor T3 has its high value. So capacitor C is discharged with absolute certainty. The circuit is now in the same state as at the end of the field trace period.

If a positive going disturbing pulse occurs in the signal at terminal A then this pulse may cause an increase of voltage $V_C$ and may even make transistor T11 conductive provided the pulse duration is sufficiently long, but generally the pulse will be too short, that is to say shorter than approximately 15 μs to make transistor T17 conductive and consequently to cause the generation of an output signal. The next following line flyback pulse present at terminal G, which makes transistor T10 conductive short-circuits voltage $V_C$ with respect to ground. If transistor T11 has been made conductive by the disturbing pulse then flip-flop T14, T15 has changed state at that moment, causing the voltage at point M and consequently the collector current of transistor T13 to become high. So a subsequent disturbing pulse will only produce a low charging current of capacitor C. Voltage $V_C$ remains low, more specifically until the occurrence of the next train of pre-equalizing pulses. In this situation the field terminates with half a line and the first pre-equalizing pulse coincides with a line flyback pulse. If the circuit has not been set by a disturbing pulse to the preparatory state in which voltage $V_C$ has attained the first threshold value, then said state is not initiated by the first but by the second pre-equalizing pulse. If the incoming signal contains so much noise that the first pre-equalizing pulse in the case of the field shown in FIG. 2, and the second pre-equalizing pulse in the case of the subsequent field does not initiate the preparatory state, then said state will be initiated for one field by the third or the fifth pre-equalizing pulse or for the subsequent field by the fourth pre-equalizing pulse. If also these pulses are "missed" then the first field synchronizing pulse causes the first and thereafter the second threshold value to be reached by the voltage $V_C$. Only in the event that this does not happen the circuit of FIG. 1 does not generate an output signal but then the television signal received by the television receiver of which the circuit is part, contains so much noise that it would anyway not be possible to obtain a viewable picture.

From the foregoing it appears that the circuit of FIG. 1 generates a rather reliable pulse at terminal F, the leading edge of which occurs a fixed period of time after the leading edge of the first field synchronizing pulse and the trailing edge occurs a fixed period of time after trailing edge of the last field synchronizing pulse and which pulse is consequently suitable to be applied as a field synchronizing signal to a field synchronizing circuit connected to terminal F. This also holds for the event that the incoming signal is a nonstandard signal, that is to say a signal not containing equalizing pulses. It should be noted that an interlace error is prevented from occurring as the line flyback pulses applied to terminal G do not have any influence at the occurrence of the first field synchronizing pulse. Otherwise charging of capacitor C could not start until after the trailing edge of the line flyback pulse which occurs simultaneously with said pulse, which would imply a shift of the leading edge of the pulse of FIG. 2d. However, this shift would not occur at the next field, namely because of the fact that a line flyback pulse does then not coincide with the first field synchronizing pulse, which results in that one field would start approximately 12 μs too late and the other field at the correct moment. It can also be seen that the video information in the signal of FIG. 2a plays no part in the generation of the field synchronizing signal so that the signal applied to terminal A may be a composite television synchronizing signal, that is to say a signal which does not contain video information.

In the circuit of FIG. 1 flip-flop T14, T15 acts as a memory element. As a result thereof the application of line flyback pulses to the circuit has no effect after the first threshold value has been reached, while charging of capacitor C is performed slowly. Without the flip-flop voltage $V_C$ would rapidly decrease after the occurrence of the first pre-equalizing pulse, which entails the risk, especially when there is much noise and little interference pulses, that the first threshold level would not be reached during the pre-equalizing interval. This could result in an interlace error.

It will be obvious that portions of the circuit shown in FIG. 1 may be constructed in a different way. The portion comprising the transistors T20, T21, T22 and T23 may be replaced by, for example, a monostable element since it operates as a delay element, while transistors T25 and T26 form a circuit with an OR function and transistors T9 and T10 form a circuit with an AND function. The change-over of the charging and discharging current, respectively of capacitor C may be performed in a different, known manner. Instead thereof the capacitor itself may be switched to a different value. The duration of the pulses of the line frequency applied to terminal G is not critical: the sole requirement to be satisfied is that said pulses must include the line synchronizing pulses of the signal applied to terminal A, but it is obvious that they must be shorter than 32 μs.

What is claimed is:

1. A circuit arrangement for deriving a field synchronizing signal from an incoming signal which contains at least line synchronizing and field synchronizing pulses whose amplitude extends between a reference and a peak level, comprising a signal generator for generating a signal each time a pulse having a value which is located between the reference and the peak level occurs in the incoming signal, said generated signal having a value which is representative of the duration of said pulse, and a comparator stage for comparing the generated signal with a threshold value, characterized in that the circuit arrangement also comprises a gate circuit for, in operation, inhibiting the output signal from the signal generator during the occurrence of the line synchronizing pulses before the threshold value is reached by the signal from the signal generator, this gate circuit being inoperative when said threshold value has been reached by said signal, and means operatively connected to said signal generator for determining when the signal from the signal generator reaches a second threshold value which is representative of a pulse duration which exceeds the duration corresponding to the first mentioned threshold value for producing said field synchronizing signal in response thereto.

2. A circuit arrangement as claimed in claim 1, characterized in that the gate circuit comprises a gate for passing, outside the field blanking interval, pulses at the line frequency whose occurrence periods substantially include those of the line synchronizing pulses and for inhibiting the supply of said pulses at the line frequency after the signal from the signal generator has reached the first threshold value.

3. A circuit arrangement as claimed in claim 2, characterized in that it further comprises a timing circuit for maintaining the gate circuit during a predetermined period of time after the second threshold value has been reached by the signal from the signal generator in the state in which the gate inhibits the supply of the pulses at the line frequency.

4. A circuit arrangement as claimed in one of the claims 2 or 3, characterized in that the pulses at the line frequency are line flyback blanking pulses originating from a line deflection circuit.

5. A circuit arrangement as claimed in claim 1, in which the signal generator generates during the occurrence of a pulse in the incoming signal a substantially linear signal, characterized in that the slope of the substantially linear signal is reduced after the first threshold value has been reached.

6. A circuit arrangement as claimed in claim 5, characterized in that the slope of the substantially linear signal is steeper after the second threshold value has been reached than prior to that moment.

7. A circuit arrangement as claimed in claims 1, 2 or 3, characterized in that the circuit arrangement comprises a bistable element which is in a first state when the signal from the signal generator is lower than the first threshold value and in a second state after the signal has reached the first threshold value, the second state being maintained until at least the end of the field synchronizing signal, in which second state the bistable element maintains the gate circuit in the state in which the gate inhibits the supply of the pulses of line frequency.

8. A circuit arrangement as claimed in claim 7, characterized in that the timing circuit is coupled to the bistable element for setting it to its first state.

9. A circuit arrangement as claimed in claim 3, characterized in that it also comprises a second comparator stage for comparing the signal of the signal generator with the second threshold value and for setting the timing circuit when said signal has reached said second threshold value.

10. A circuit arrangement for deriving a field synchronizing signal from an incoming signal which contains at least line synchronizing and field synchronizing pulses, and line flyback pulses coincident with said line synchronizing pulses, comprising
   first threshold detection means responsive to said incoming signal for determining when a magnitude of said input signal exceeds a predetermined first threshold,
   second threshold detection means responsive to an output signal of said first threshold detection means for determining when the magnitude of said output signal exceeds a predetermined second threshold that differs from said first threshold and to generate said field synchronizing signal in response thereto,
   gating means responsive to said line blanking pulses and operatively connected to said first threshold detection means for preventing the output of said first threshold detection means from being applied to said second threshold detection means during the occurence of said line synchronizing pulses, and timing circuit means operatively connected to the output of said second threshold detection means for disabling said gating means for a predetermined time in response to the output of said second threshold detection means.

11. Apparatus according to claim 10 wherein said first threshold detection means includes a differential amplifier, a level detection circuit operatively connected to said differential amplifier, and a bistable multi-vibrator operatively connected to said level detection circuit, said bistable multi-vibrator changing states in response to said incoming signal magnitude exceeding said first threshold level.

12. Apparatus according to claim 10 wherein said timing circuit includes capacitance means and a switching element responsive to the voltage on said capacitance means.

* * * * *